(12) United States Patent
Wang et al.

(10) Patent No.: US 11,281,939 B2
(45) Date of Patent: Mar. 22, 2022

(54) METHOD AND APPARATUS FOR TRAINING AN OBJECT IDENTIFICATION NEURAL NETWORK, AND COMPUTER DEVICE

(71) Applicant: CLOUDMINDS (SHENZHEN) ROBOTICS SYSTEMS CO., LTD., Shenzhen (CN)

(72) Inventors: Wenqi Wang, Shenzhen (CN); Shiguo Lian, Shenzhen (CN); Yibing Nan, Shenzhen (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 13 days.

(21) Appl. No.: 16/738,804

(22) Filed: Jan. 9, 2020

(65) Prior Publication Data

US 2020/0320342 A1  Oct. 8, 2020

(30) Foreign Application Priority Data

Jan. 10, 2019  (CN) .......................... 201910022601.5

(51) Int. Cl.
| | | |
|---|---|---|
| *G06K 9/00* | (2006.01) | |
| *G06K 9/62* | (2022.01) | |
| *G06K 9/32* | (2006.01) | |
| *G06T 7/11* | (2017.01) | |

(52) U.S. Cl.
CPC ......... *G06K 9/6256* (2013.01); *G06K 9/3233* (2013.01); *G06K 9/6267* (2013.01); *G06T 7/11* (2017.01); *G06T 2207/20081* (2013.01); *G06T 2207/20084* (2013.01)

(58) Field of Classification Search
CPC .. G06K 9/6256; G06K 9/3233; G06K 9/6267; G06K 9/6255; G06T 7/11; G06T 2207/20081; G06T 2207/20084
See application file for complete search history.

(56) References Cited

U.S. PATENT DOCUMENTS

| | | | |
|---|---|---|---|
| 2016/0283821 A1* | 9/2016 | Abhau | .............. G06K 9/4652 |
| 2019/0095754 A1* | 3/2019 | Chen | .............. G06K 9/00624 |

* cited by examiner

*Primary Examiner* — Ping Y Hsieh

(57) ABSTRACT

A method for training an object identification neural network based on a distorted fisheye image includes: acquiring the distorted fisheye image, wherein the distorted fisheye image comprises at least one target object; dividing the distorted fisheye image into a plurality of zones according to a distortion degree; determining a zone to which each of the at least one target object belongs; categorizing the at least one target object according to the zone to which each of the at least one target object belongs; and inputting the distorted fisheye image and a category to which each of the at least one target object belongs into the object identification neural network to train the object identification neural network.

14 Claims, 3 Drawing Sheets

METHOD AND APPARATUS FOR TRAINING AN OBJECT IDENTIFICATION NEURAL NETWORK, AND COMPUTER DEVICE

CROSS-REFERENCE TO RELATED APPLICATIONS

This application claims priority to Chinese Patent Application No. 201910022601.5, filed with the Chinese Patent Office on Jan. 10, 2019, titled "METHOD AND APPARATUS FOR TRAINING AN OBJECT IDENTIFICATION NEURAL NETWORK, AND COMPUTER DEVICE", the entire contents of which are incorporated herein by reference.

TECHNICAL FIELD

Embodiments of the present disclosure relate to a technical field of computer vision, and in particular, relate to a method and apparatus for training an object identification neural network, and a computing device thereof.

BACKGROUND

Fisheye lenses are special lenses having a greater view angle and a shorter focal distance over standard lenses. Due to the greater view angle and the short focal distance, fisheye images captured by the fisheye lens have distortions. At present, the fisheye lens is mainly applied in video surveillance scenarios. The distorted images captured by the fisheye lens are corrected to pictures complying with the human eye effect, and then the corrected fisheye images are spliced by using a splicing algorithm, and the spliced image is identified by using a target detection and identification algorithm.

During practice of the present disclosure, the inventors have identified that in the related art, the distorted fisheye images need to be corrected to the images complying with the human eye effect, the process is complex, and the distorted fisheye images may not be directly identified.

SUMMARY

An embodiment of the present disclosure provides a method for training an object identification neural network based on a distorted fisheye image. The method includes: acquiring the distorted fisheye image, wherein the distorted fisheye image comprises at least one target object; dividing the distorted fisheye image into a plurality of zones according to a distortion degree; determining a zone to which each of the at least one target object belongs; categorizing the at least one target object according to the zone to which each of the at least one target object belongs; and inputting the distorted fisheye image and a category to which each of the at least one target object belongs into the object identification neural network to train the object identification neural network.

Another embodiment of the present disclosure provides a computing device. The computing device includes: a processor, a memory, a communication interface and a communication bus; wherein the processor, the memory and the communication bus communicate with each other via the communication bus; and the memory is configured to store at least one executable instruction, wherein the executable instruction, when being executed by the processor, causes the processor to perform the steps of: acquiring the distorted fisheye image, wherein the distorted fisheye image comprises at least one target object; dividing the distorted fisheye image into a plurality of zones according to a distortion degree; determining a zone to which each of the at least one target object belongs; categorizing the at least one target object according to the zone to which each of the at least one target object belongs; and inputting the distorted fisheye image and a category to which each of the at least one target object belongs into the object identification neural network to train the object identification neural network.

Still another embodiment of the present disclosure provides a computer-readable storage medium. The storage medium stores at least one executable instruction; wherein the executable instruction, when being executed, causes the processor to perform the steps of: acquiring the distorted fisheye image, wherein the distorted fisheye image comprises at least one target object; dividing the distorted fisheye image into a plurality of zones according to a distortion degree; determining a zone to which each of the at least one target object belongs; categorizing the at least one target object according to the zone z to which each of the at least one target object belongs; and inputting the distorted fisheye image and a category to which each of the at least one target object belongs into the object identification neural network to train the object identification neural network.

BRIEF DESCRIPTION OF THE DRAWINGS

The accompanying drawings are merely for illustrating the embodiments, but shall not be construed as limiting the present disclosure. In all the accompanying drawings, like reference signs denote like parts. In the drawings.

DETAILED DESCRIPTION

Some exemplary embodiments of the present disclosure are hereinafter described in detail with reference to the accompanying drawings. Although the accompanying drawings illustrate the exemplary embodiments of the present disclosure, it shall be understood that the present disclosure may be practiced in various manners, and the present disclosure shall not be limited by the embodiments illustrated herein. On the contrary, these embodiments are described herein only for the purpose of better understanding the present disclosure, and may integrally convey the scope of the present disclosure to a person skilled in the art.

Figure 1:
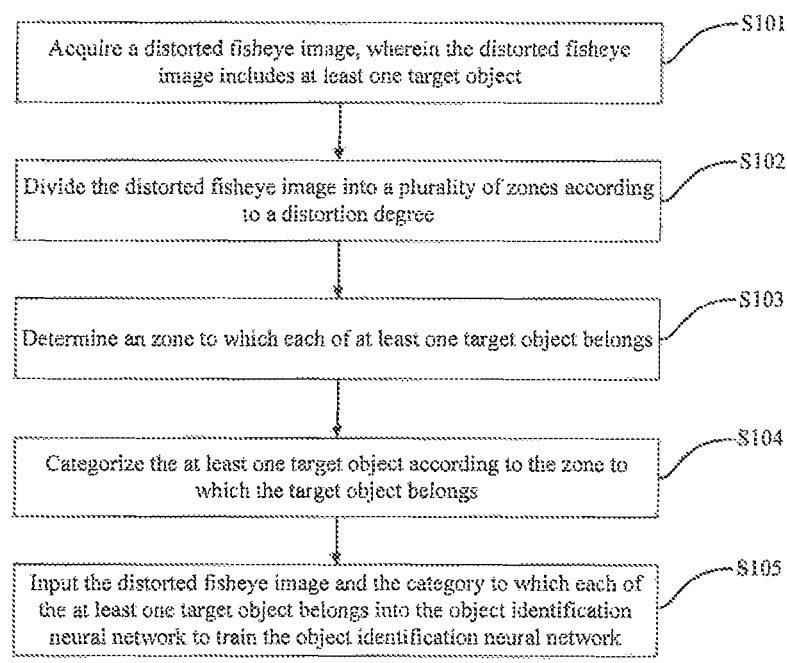
FIG. 1 is a flowchart of a method for training an object identification neural network according to an embodiment of the present disclosure.

FIG. 1 is a flowchart of a method for training an object identification neural network according to an embodiment of the present disclosure. As illustrated in FIG. 1, the method includes the following steps:

Step S101: The distorted fisheye image is acquired, wherein the distorted fisheye image comprises at least one target object.

In this step, the distorted fisheye image is a picture captured by a fisheye lens. Due to the greater view angle and the short focal distance, the fisheye image captured by the fisheye lens has distortions.

Step S102: The distorted fisheye image is divided into a plurality of zones according to a distortion degree.

Since the bending degree of the distortion of the fisheye lens is irregular, but distribution of the distortion degrees is regular, according to the distortion characteristic of the fisheye lens, the distortion within the view angle range of the fisheye lens is analyzed and parts of the distorted fisheye image with the identical distortion degrees are defined as one zone. In the embodiment of the present disclosure, the distorted fisheye image is divided into a plurality of zones by using several concentric circles having different sizes. It should be noted that, in the same zone, the target objects have the same distortion degree.

Step S103: A zone to which the target object belongs is determined.

Figure 2:
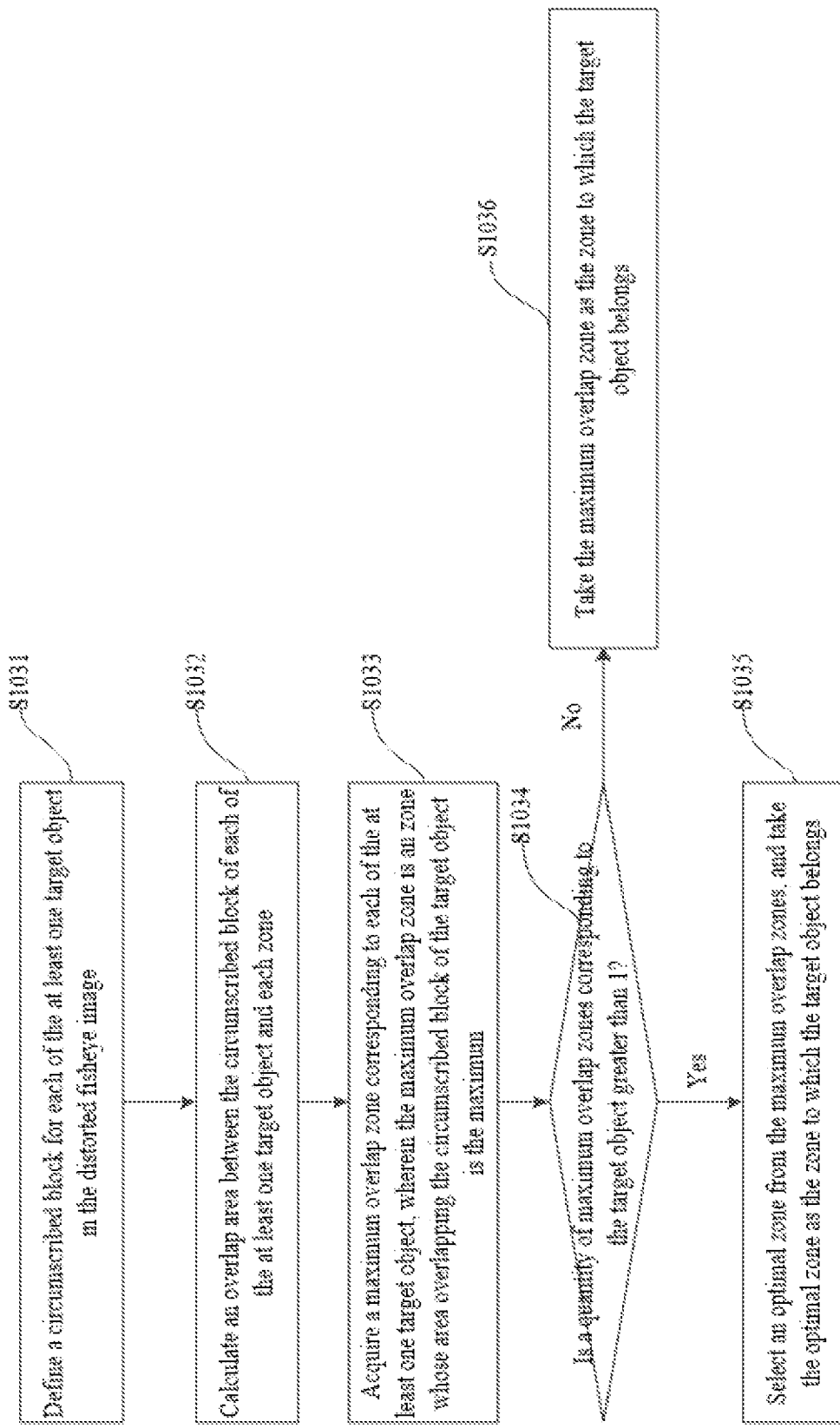
FIG. 2 is a schematic diagram of determining a zone to which a target object belongs in the method for training an object identification neural network according to an embodiment of the present disclosure.

In this step, as illustrated in FIG. 2, the zone to which the target object belongs is determined by the following steps:

Step S1031: A circumscribed block is defined for each of the at least one target object in the distorted fisheye image.

The circumscribed block refers to a minimum block which is capable of totally covering a target object in the distorted fisheye image.

Step S1032: An overlap area between the circumscribed block of each of the at least one target object and each zone is calculated.

The overlap area refers to the area of each zone that is included in the circumscribed block. The overlap area may be calculated by using the integration algorithm, or may be calculated by using pixel points in an overlap zone between the circumscribed block and the zone. The specific method for calculating the overlap area is not limited in the embodiment of the present disclosure. In addition, since the integration algorithm is a method for calculating the area of an irregular zone, which is a known technique, and is thus not described herein any further.

Step S1033: A maximum overlap zone corresponding to each of the at least one target object is acquired, wherein the maximum overlap zone is a zone whose overlap area with the circumscribed block of the target object is the maximum.

In this step, the overlap areas between the circumscribed block and each zone are ranked in a descending order to obtain an overlap zone corresponding to the maximum overlap area.

Step S1034: Whether a quantity of a maximum overlap zone corresponding to the target object is greater than 1 is judged. If the quantity is greater than 1, step S1035 is performed; and otherwise, step S1036 is performed.

In this step, when the circumscribed block of a target object is located in many zones, the quantity of the maximum overlap area may be greater than 1, and the quantity of corresponding overlap zone may be also greater than 1. For example, when the overlap areas between the circumscribed block and two zones are equal and are the maximum, the quantity of maximum overlap zones corresponding to the target object is greater than 1.

Step S1035: An optimal zone is selected from the maximum overlap zones, and the optimal zone is taken as the zone to which the target object belongs.

In this step, the optimal zone is a zone most proximal to the center of the distorted fisheye image in the maximum overlap zones. When the quantity of maximum overlap zones corresponding to the target object is greater than 1, the zone most proximal to the center of the distorted fisheye image is taken as the zone to which the target object belongs.

Step S1036: The maximum overlap zone is taken as the zone to which the target object belongs.

In this step, the maximum overlap zone is taken as the zone to which the target object belongs if the quantity of the maximum overlap area corresponding to the target object is only 1.

Step S104: The at least one target object is categorized according to the zone to which the target object belongs.

In this step, categorizing the at least one target object according to the zone to which the target object belongs includes: placing identical target objects belonging to the same zone into a category. For example, the distorted fisheye image includes two categories of target objects A and B, wherein there are three target objects A which are respectively marked as a target object A1, a target object A2 and a target object A3, and there is only one target objects B; and there are three zones which are sequentially an Area_1, an Area_2 and an Area_3 from the center of the distorted fisheye image to the outside thereof, wherein it is determined that the target object A1 and the target object A2 belong to the Area_1, the target object A3 belongs to the Area 2, and the target object B belongs to the Area_3. In this case, the target object A1 and the target object A2 are placed into the same category which is marked as A-1, the target object A3 is placed into a category which is marked as A-2, and the target object B is placed into a category which is marked as B-3.

Step S105: The distorted fisheye image and the category to which each of the at least one target object belongs are input into the object identification neural network to train the object identification neural network.

The distortion degrees of the target objects in different areas in the distorted fisheye image are different, and the target objects are input into the object identification neural network for training according to the zone and the category of the target objects. As compared with the object identification neural network that is directly trained without categorization of the target object, the embodiment of the present disclosure categorizes the target object according to the distortion degree, which may improve the identification effect of the target identification neural network based on the distorted fisheye image.

In this step, a number of acquired object categories and the corresponding distorted fisheye images are input into the object identification neural network for training, such that a trained object identification neural network is obtained. The target identification neural network is a conventional mainstream neural network, whose specific type is not limited herein. The trained object identification neural network may identify various target object categories used in training the neural network.

In the embodiment of the present disclosure, the distorted fisheye image is divided into a plurality of zones according to the distortion degrees, the target object in each of the zones is categorized, and the distorted fisheye image and the category of the target object are input into the object identification neural network for training such that the trained object identification neural network is obtained. The trained object identification neural network may directly identify the target object in the distorted fisheye image.

In an embodiment, a method for identifying an object is provided. The method includes: receiving an input distorted fisheye image; and identifying the distorted fisheye image by the object identification neural network obtained by the method for training the object identification neural network to obtain object information of a target object included in the distorted fisheye.

The object identification neural network obtained by the method for training the object identification neural network achieves a better effect in identifying the object information of the target object included in the distorted fisheye image. Therefore, when the target object included in the distorted fisheye image is identified by using the object identification neural network, the effect of object identification may be improved.

Figure 3:
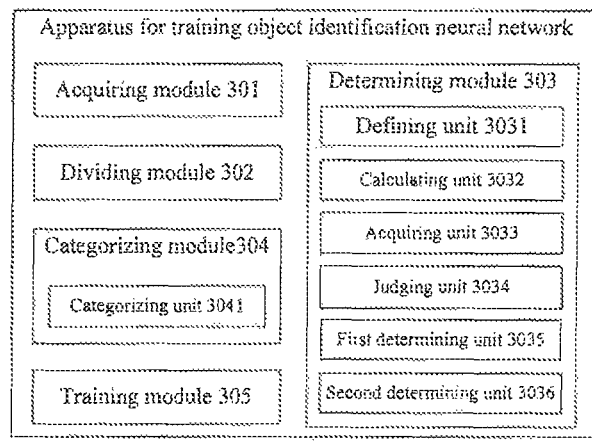
FIG. 3 is a functional block diagram of an apparatus for training an object identification neural network according to an embodiment of the present disclosure.

FIG. 3 is a functional block diagram of an apparatus for training an object identification neural network. As illustrated in FIG. 3, the apparatus includes: an acquiring module 301, a dividing module 302, a determining module 303, a categorizing module 304 and a training module 305. The acquiring module 301 is configured to acquire a distorted fisheye image, wherein the distorted fisheye image includes at least one target object. The dividing module 302 is configured to divide the distorted fisheye image into a plurality of zones according to a distortion degree. The determining module 303 is configured to determine a zone to which the target object belongs. The categorizing module 304 is configured to categorize the at least one target object according to the zone to which the target object belongs. The training module 305 is configured to input the distorted fisheye image and the category to which each of the at least one target object belongs into the object identification neural network to train the object identification neural network.

The determining module includes: a defining unit 3031, a calculating unit 3032, an acquiring unit 3033, a judging unit 3034, a first determining unit 3035 and a second determining unit 3036. The defining unit 3031 is configured to define a circumscribed block for each of the at least one target object in the distorted fisheye image. The calculating unit 3032 is configured to calculate an overlap area between the circumscribed block of each of the at least one target object and each zone. Then acquiring unit 3033 is configured to acquire a maximum overlap zone corresponding to each of the at least one target object, wherein the maximum overlap zone is a zone whose overlap area with the circumscribed block of the target object is the maximum. The judging unit 3034 is configured to judge whether a quantity of a maximum overlap zone corresponding to the target object is greater than 1. The first determining unit 3035 is configured to take the maximum overlap zone as the zone to which the target object belongs if the quantity of maximum overlap zone corresponding to the target object is 1. The second determining unit 3036 is configured to, if the quantity of maximum overlap zone corresponding to the target object is greater than 1, select an optimal zone from the maximum overlap zones, and take the optimal zone as the zone to which the target object belongs, wherein the optimal zone is an zone most proximal to a center of the distorted fisheye image in the maximum overlap zones.

The categorizing module 304 includes a categorizing unit 3041, configured to place identical target objects belonging to the same zone into a category.

In the same zone, the target objects have the same distortion degree.

In an embodiment, an apparatus for identifying an object is provided. The apparatus includes a receiving module and an identifying module. The receiving module is configured to receive an input distorted fisheye image. The identifying module is configured to identify the distorted fisheye image by an object identification neural network obtained by the apparatus for training the object identification neural network to obtain object information of at least one target object included in the distorted fisheye.

In the embodiment of the present disclosure, the distorted fisheye image is divided by the dividing module into a plurality of zones according to the distortion degrees, the target object in each zone is categorized by the categorizing module, and the distorted fisheye image and the category of the target object are input by the training module into the object identification neural network for training such that the trained object identification neural network is obtained. The trained object identification neural network may directly identify the target object in the distorted fisheye image.

An embodiment of the present disclosure further provides a non-volatile computer storage medium, wherein the computer storage medium stores at least one computer-executable instruction, which may be executed to perform the method for training the target identification neural network in any of the above method embodiments.

Figure 4:
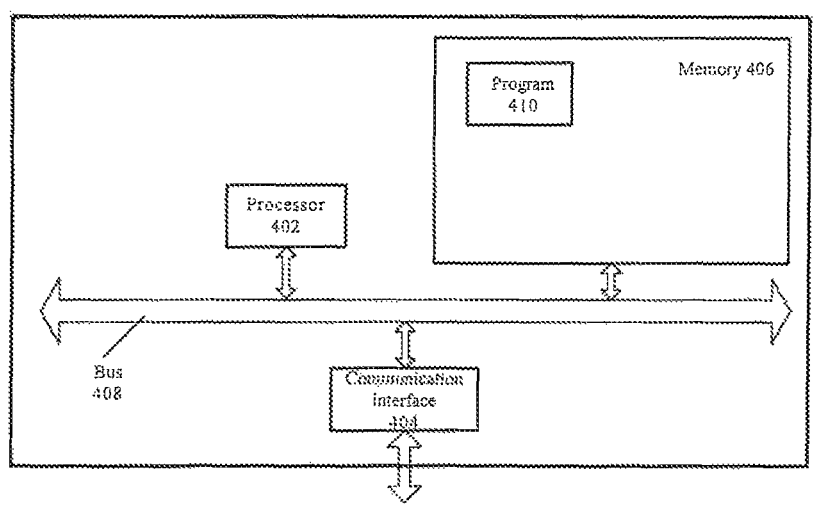
FIG. 4 is a schematic diagram of a computing device according to an embodiment of the present disclosure.

FIG. 4 is a schematic structural diagram of a computing device according to an embodiment of the present disclosure. The specific embodiments of the present disclosure set no limitation to the practice of the computing device.

As illustrated in FIG. 4, the computing device may include: a processor 402, a communication interface 404, a memory 406 and a communication bus 408.

The processor 402, the communication interface 404 and the memory 406 communicate with each other via the communication bus 408.

The communication interface 404 is configured to communicate with a network element such as a client, a server or the like.

The processor 402 is configured to execute the program 410, and may specifically perform steps in the embodiments of the method for training the target identification neural network.

Specifically, the program 410 may include a program code, wherein the program code includes a computer-executable instruction.

The processor 402 may be a central processing unit (CPU) or a specific disclosure specific integrated circuit (ASIC), or configured as one or more integrated circuits for implementing the embodiments of the present disclosure. The computing device includes one or more processors, which may be the same type of processors, for example, one or more CPUs, or may be different types of processors, for example, one or more CPUs and one or more ASICs.

The memory 406 is configured to store the program 410. The memory 406 may include a high-speed RAM memory, or may also include a non-volatile memory, for example, at least one magnetic disk memory.

The program 410 may be specifically configured to cause the processor 402 to perform the following operations:

acquiring the distorted fisheye image, wherein the distorted fisheye image comprises at least one target object;

dividing the distorted fisheye image into a plurality of zones according to a distortion degree;

determining a zone to which the target object belongs;

categorizing the at least one target object according to the zone to which the target object belongs; and inputting the distorted fisheye image and the category to which each of the at least one target object belongs into the object identification neural network to train the object identification neural network.

In an optional implementation, the program 410 may be specifically further configured to cause the processor 402 to perform the following operations:

defining a circumscribed block for each of the at least one target object in the distorted fisheye image;

calculating an overlap area between the circumscribed block of each of the at least one target object and each zone;

acquiring a maximum overlap zone corresponding to each of the at least one target object, wherein the maximum overlap zone is an zone whose overlap area with the circumscribed block of the target object is the maximum;

judging whether a quantity of maximum overlap areas corresponding to the target object is greater than 1;

taking the maximum overlap zone as the zone to which the target object belongs if the quantity of maximum overlap zones corresponding to the target object is 1; and if the quantity of maximum overlap zones corresponding to the target object is greater than 1, selecting an optimal zone from the maximum overlap zones, and taking the optimal zone as the zone to which the target object belongs, wherein the optimal zone is an zone most proximal to a center of the distorted fisheye image in the maximum overlap zones.

In an optional implementation, the program 410 may be specifically further configured to cause the processor 402 to perform the following operation:

categorizing the at least one target object according to the zone to which the target object belongs includes:

placing identical target objects belonging to the same zone into a category.

In an optional implementation, in the same zone, the target objects have the same distortion degree.

In an optional implementation, the program 410 may be specifically further configured to cause the processor 402 to perform the following operations:

receiving an input distorted fisheye image; and identifying the distorted fisheye image by an object identification neural network obtained by the method for training the object identification neural network to obtain object information of at least one target object included in the distorted fisheye.

The algorithms and displays provided herein are not inherently related to any specific computer, virtual system or other device. Various general-purpose systems may also be used with the teachings herein. According to the above description, the structure required for constructing such systems is obvious. In addition, the present disclosure is not directed to any specific programming language. It should be understood that the content of the present disclosure described herein may be carried out utilizing various programming languages, and that the above description for a specific language is for the sake of disclosing preferred embodiments of the present disclosure.

In the specification provided herein, a plenty of particular details are described. However, it may be understood that an embodiment of the present disclosure may also be practiced without these particular details. In some embodiments, well known methods, structures and technologies are not illustrated in detail so as not to obscure the understanding of the specification.

Likewise, it shall be understood that, to streamline the present disclosure and facilitate understanding of one or more of various aspects of the present disclosure, in the above description of the exemplary embodiments of the present disclosure, various features of the present disclosure are sometimes incorporated in an individual embodiment, drawing or description thereof. However, the method according to the present disclosure shall not be explained to embody the following intention: the present disclosure for which protection is sought claims more features than those explicitly disclosed in each of the appended claims. To be more exact, as embodied in the appended claims, the inventive aspects lie in that fewer features than all the features embodied in an individual embodiment as described above. Therefore, the claims observing the specific embodiments are herein incorporated into the specific embodiments, and each claim may be deemed as an individual embodiment of the present disclosure.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, subunits or subcomponents. Besides that such features and/or processes or at least some of the units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

In addition, those skilled in the art shall understand that, although some embodiments described herein include some features included in other embodiments, rather than other features, a combination of the features in different embodiments signifies that the features are within the scope of the present disclosure and different embodiments may be derived. For example, in the claims appended hereinafter, any one of the embodiments for which protection is sought may be practiced in any combination manner.

Embodiments of the individual components of the present disclosure may be implemented in hardware, or in a software module running one or more processors, or in a combination thereof. It will be appreciated by those skilled in the art that, in practice, some or all of the functions of some or all of the components in the message prompting apparatus according to individual embodiments of the present disclosure may be implemented using a microprocessor or a digital signal processor (DSP). The present disclosure may also be implemented as an apparatus of a device program (e.g., a computer program and a computer program product) for performing a part or all of the method as described herein. Such a program implementing the present disclosure may be stored on a computer readable medium, or may be stored in the form of one or more signals. Such a signal may be obtained by downloading it from an Internet website, or provided on a carrier signal, or provided in any other form.

It should be noted that the above embodiments illustrate rather than limit the present disclosure, and those skilled in the art may design alternative embodiments without departing from the scope of the appended claims. In the claims, any reference sign placed between the parentheses shall not be construed as a limitation to a claim. The word "comprise" or "include" does not exclude the presence of an element or a step not listed in a claim. The word "a" or "an" used before an element does not exclude the presence of a plurality of such elements. The present disclosure may be implemented by means of a hardware including several distinct elements and by means of a suitably programmed computer. In a unit claim enumerating several devices, several of the devices may be embodied by one and the same hardware item. Use of the words "first", "second", "third" and the like does not mean any ordering. Such words may be construed as naming.

What is claimed is:

1. A method for training an object identification neural network based on a distorted fisheye image, comprising:

acquiring the distorted fisheye image, wherein the distorted fisheye image comprises at least one target object;

dividing the distorted fisheye image into a plurality of zones according to a distortion degree;

determining a zone to which each of the at least one target object belongs;

categorizing the at least one target object according to the zone to which each of the at least one target object belongs; and inputting the distorted fisheye image and a category to which each of the at least one target object belongs into the object identification neural network to train the object identification neural network.

2. The method according to claim 1, wherein the step of categorizing the at least one target object according to the zone to which each of the at least one target object belongs comprises:

placing identical target objects belonging to a same zone into a category.

3. The method according to claim 1, wherein target objects in a same zone have the same distortion degree.

4. A method for training an object identification neural network based on a distorted fisheye image, comprising:

acquiring the distorted fisheye image, wherein the distorted fisheye image comprises at least one target object;

dividing the distorted fisheye image into a plurality of zones according to a distortion degree;

determining a zone to which each of the at least one target object belongs;

categorizing the at least one target object according to the zone to which each of the at least one target object belongs; and inputting the distorted fisheye image and a category to which each of the at least one target object belongs into the object identification neural network to train the object identification neural network;

wherein the step of determining the zone to which each of the at least one belongs comprises:

defining a circumscribed block for each of the at least one target object in the distorted fisheye image;

calculating an overlap area between the circumscribed block of each of the at least one target object and each zone;

acquiring a maximum overlap zone corresponding to each of the at least one target object, wherein the maximum overlap zone is a zone whose overlap area between the circumscribed block of each of the at least one target object and each area is the maximum;

judging whether a quantity of the maximum overlap zone corresponding to each of the at least one target object is greater than 1;

taking the maximum overlap zone as the zone to which each of the at least one target object belongs if the quantity of the maximum overlap zone corresponding to each of the at least one target object is 1; and if the quantity of the maximum overlap zone corresponding to each of the at least one target object is greater than 1, selecting an optimal zone from the maximum overlap zones, and taking the optimal zone as the zone to which each of the at least one target object belongs, wherein the optimal zone is a zone most proximal to a center of the distorted fisheye image among the maximum overlap zones.

5. The method according to claim 4, wherein the step of categorizing the at least one target object according to the zone to which each of the at least one target object belongs comprises:

placing identical target objects belonging to a same zone into a category.

6. The method according to claim 4, wherein target objects in a same zone have the same distortion degree.

7. A computing device, comprising: a processor, a memory, a communication interface and a communication bus; wherein the processor, the memory and the communication interface communicate with each other via the communication bus; and the memory is configured to store at least one executable instruction, wherein the executable instruction, when being executed by the processor, causes the processor to perform the steps of:

acquiring the distorted fisheye image, wherein the distorted fisheye image comprises at least one target object;

dividing the distorted fisheye image into a plurality of zones according to a distortion degree;

determining a zone to which each of the at least one target object belongs;

categorizing the at least one target object according to the zone to which each of the at least one target object belongs; and inputting the distorted fisheye image and a category to which each of the at least one target object belongs into the object identification neural network to train the object identification neural network.

8. The computer device according to claim 7, wherein the step of determining the zone to which each of the at least one belongs comprises:

defining a circumscribed block for each of the at least one target object in the distorted fisheye image;

calculating an overlap area between the circumscribed block of each of the at least one target object and each zone;

acquiring a maximum overlap zone corresponding to each of the at least one target object, wherein the maximum overlap zone is a zone whose overlap area between the circumscribed block of each of the at least one target object and each area is the maximum;

judging whether a quantity of the maximum overlap zone corresponding to each of the at least one target object is greater than 1;

taking the maximum overlap zone as the zone to which each of the at least one target object belongs if the quantity of the maximum overlap zone corresponding to each of the at least one target object is 1; and if the quantity of the maximum overlap zone corresponding to each of the at least one target object is greater than 1, selecting an optimal zone from the maximum overlap zones, and taking the optimal zone as the zone to which each of the at least one target object belongs, wherein the optimal zone is a zone most proximal to a center of the distorted fisheye image among the maximum overlap zones.

9. The computer device according to claim 7, wherein the step of categorizing the at least one target object according to the zone to which each of the at least one target object belongs comprises:

placing identical target objects belonging to a same zone into a category.

10. The computer according to claim 7, wherein target objects in a same zone have the same distortion degree.

11. A non-transitory computer-readable storage medium, the storage medium storing at least one executable instruction; wherein the executable instruction, when being executed, causes a processor to perform the steps of:
   acquiring the distorted fisheye image, wherein the distorted fisheye image comprises:
   dividing the distorted fisheye image into a plurality of zones according to a distortion degree;
   determining a zone to which each of the at least one target object belongs;
   categorizing the at least one target object according to the zone to which each of the at least one target object belongs; and
   inputting the distorted fisheye image and a category to which each of the at least one target object belongs into the object identification neural network to train the object identification neural network.

12. The non-transitory computer-readable storage medium according to claim 11, wherein the step of determining the zone to which each of the at least one belongs comprises:
   defining a circumscribed block for each of the at least one target object in the distorted fisheye image;
   calculating an overlap area between the circumscribed block of each of the at least one target object and each zone;
   acquiring a maximum overlap zone corresponding to each of the at least one target object, wherein the maximum overlap zone is a zone whose overlap area between the circumscribed block of each of the at least one target object and each area is the maximum;
   judging whether a quantity of the maximum overlap zone corresponding to each of the at least one target object is greater than 1;
   taking the maximum overlap zone as the zone to which each of the at least one target object belongs if the quantity of the maximum overlap zone corresponding to each of the at least one target object is 1; and
   if the quantity of the maximum overlap zone corresponding to each of the at least one target object is greater than 1, selecting an optimal zone from the maximum overlap zones, and taking the optimal zone as the zone to which each of the at least one target object belongs, wherein the optimal zone is a zone most proximal to a center of the distorted fisheye image among the maximum overlap zones.

13. The non-transitory computer-readable storage medium according to claim 11, wherein the step of categorizing the at least one target object according to the zone to which each of the at least one target object belongs comprises:
   placing identical target objects belonging to a same zone into a category.

14. The non-transitory computer-readable storage medium according to claim 11, wherein target objects in a same zone have the same distortion degree.

* * * * *